United States Patent [19]

Watson et al.

[11] 4,197,198

[45] Apr. 8, 1980

[54] TREATMENT OF NITRATED PHENOL CONTAINING EFFLUENT STREAMS

[75] Inventors: James M. Watson, Big Spring, Tex.; Deirdre G. Bradway, Baton Rouge, La.; Philippe Camerman, Wezembeek-Oppem, Belgium

[73] Assignee: Cosden Technology, Inc., Big Spring, Tex.

[21] Appl. No.: 935,148

[22] Filed: Aug. 21, 1978

[51] Int. Cl.$^2$ ............................................... L02B 1/36
[52] U.S. Cl. ............................................................ 210/62
[58] Field of Search ................................. 210/62, 50, 51

[56] References Cited

U.S. PATENT DOCUMENTS

| | | | |
|---|---|---|---|
| 2,452,970 | 11/1948 | Vincent et al. | 210/62 |
| 3,617,581 | 11/1971 | Wang et al. | 210/62 |
| 3,975,284 | 8/1976 | Lambert | 210/62 X |

FOREIGN PATENT DOCUMENTS 51-39959  4/1976  Japan ........................................ 210/62

Primary Examiner—Thomas G. Wyse
Attorney, Agent, or Firm—Schwartz, Jeffery, Schwaab, Mack, Blumenthal & Koch

[57] ABSTRACT

Disclosed is a process for removing nitro phenols from aqueous effluent streams comprising adding chlorine dioxide to the effluent stream in an amount sufficient to substantially degrade the nitro phenolic contaminant. The process of the instant invention is particularly suitable for removing dinitro cresols from the oily effluent streams of petrochemical operations.

11 Claims, No Drawings

TREATMENT OF NITRATED PHENOL CONTAINING EFFLUENT STREAMS

BACKGROUND OF THE INVENTION

The present invention relates to a process for the treatment of waste water or other aqueous streams contaminated with nitro phenols, and it particularly relates to the chemical treatment of such aqueous streams to degrade dinitrated phenolic contaminants of the formula:

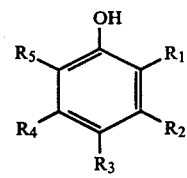

(wherein $R_1$, $R_3$, and $R_5$ are nitro, hydrogen, or alkyl groups, $R_2$ and $R_4$ are hydrogen or nitro groups, and at least two of said $R_1$, $R_2$, $R_3$, $R_4$, and $R_5$ are nitro groups) into colorless and relatively harmless nonaromatic fragments.

Nitro phenols and the derivatives thereof are commonly encountered contaminants in aqueous waste from various chemical processes. Such compounds have most recently been suggested for use as polymerization inhibitors in petrochemical conversion processes for the production of vinyl aromatic compounds. During the course of such chemical processes, effluent streams contaminated with nitro phenols are frequently produced. Before waste streams contaminated with these compounds can be discharged freely into the environment, however, current pollution control regulations require that the nitro phenolic contaminants be substantially removed therefrom. However, since these substances cannot be broken down by biological means and heretofore have been resistant to simple chemical decomposition, the nitrated phenols have presented a very difficult waste disposal problem.

One approach to this problem is suggested in U.S. Pat. No. 3,617,581, which describes a process for decomposing oxy aromatic contaminants by dissolving excess alkali in the contaminated water, and then contacting the resultant alkaline solution with sufficient chlorine to reduce the pH below 7. Mono nitrated phenols, such as chloronitrophenol are taught as being successfully degraded by this process and, this process is also suggested as suitable for the degradation of dinitro-o-sec-butylphenol. The use of chlorine gas as a degradation agent is undesirable, since in aqueous solution, chlorine forms hypochlorous acid which has a very sharp odor at concentrations of as low as 3.5 parts per million, and is also extremely corrosive.

It is also known in the art that chlorine dioxide may be used for the degradation of phenol. See, for example, U.S. Pat. No. 4,013,761. Similarly, it is described in Chemical Abstracts, Volume 60, No. 14422G and H, that phenol or chlorophenol may be oxidized with 14–18% chlorine dioxide in air to the corresponding quinones in 12–82% yields. It is also described that paranitrophenol may be oxidized with chlorine dioxide in a very small yield. However, this reference teaches that the dinitro- and trinitro phenols are stable to chlorine dioxide treatment, and cannot be decomposed thereby, corroborating the opinion of those skilled in the art that the dinitro- and trinitro phenols are particularly resistant to chemical decomposition and cannot be decomposed by simple chemical treatment.

Accordingly, in view of the large commercial importance of the nitrated phenols, particularly the higher nitrated phenols, and the difficult waste disposal problems associated therewith, there exists a great need in the art for a simple and economical process for treating aqueous streams to remove these contaminants therefrom.

SUMMARY OF THE INVENTION

Accordingly, it is in an object of the present invention to provide a process for treating aqueous streams contaminated with nitro phenols, particularly the dinitro- and trinitro phenols.

It is an additional object of the present invention to provide a chemical treatment process for decomposing nitro phenolic contaminants present in aqueous streams.

It is a particular object of the present invention to provide a process for removing dinitro phenolic contaminants from aqueous streams by chemical decomposition.

It is a specific object of the present invention to provide a process for decomposing dinitro cresol contaminants from aqueous streams.

A further object of the present invention is to provide a method for treating the oily effluent streams produced by petrochemical operations to remove nitro phenols therefrom.

In accomplishing the foregoing and other objects, there has been provided in accordance with the present invention a process for removing nitrated phenolic contaminants of formula (I):

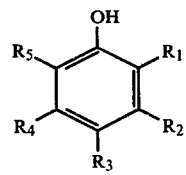

(wherein $R_1$, $R_3$, and $R_5$ are nitro, hydrogen, or alkyl groups, $R_2$ and $R_4$ are hydrogen or nitro groups, and at least two of said $R_1$, $R_2$, $R_3$, $R_4$, and $R_5$ are nitro groups) from aqueous streams, comprising adding chlorine dioxide to the contaminated stream in an amount sufficient to substantially decompose the nitrated phenolic contaminants. In contravention to the explicit teachings of the prior art, applicants have found that chlorine dioxide, when used in a substantial excess relative to the amount of nitro phenolic contaminant present in the aqueous stream, efficaciously and irreversibly decomposes the nitro phenol contaminants of formula (I) into colorless and less harmful nonaromatic fragments which can be disposed of by conventional means. Accordingly, the present invention provides a particularly efficacious method for the treatment of aqueous streams, particularly effluent streams, contaminated with these substances.

Broadly, the process of the instant invention has been found to be highly suitable for use in treating aqueous streams to decompose any of the aforementioned nitro phenols. However, the process of the instant invention is particularly advantageous for use in the treatment of aqueous streams contaminated with dinitro cresols, particularly the dinitro ortho and para cresols, such as 2,6-dinitro-paracresol. Moreover, any amount of chlorine dioxide sufficient to substantially decompose the nitro phenolic contaminants may be used. Applicants have found, however, that the advantages of the present invention are best achieved when a substantial excess of chlorine dioxide relative to the amount of nitro phenolic contaminant is employed, preferably at least about 4.5 moles chlorine dioxide to each mole of nitrated phenolic contaminant. Furthermore, the chlorine dioxide may be added to the contaminated aqueous stream in any method well known to those skilled in the art. Conveniently, however, the chlorine dioxide is added to the aqueous stream in the form of an aqueous chlorine dioxide solution as this method of use considerably eases handling.

Other objects, features, and advantages of the instant invention will become apparent to the skilled artisan upon examination of the following detailed description of the present invention.

DETAILED DESCRIPTION OF THE PREFERRED EMBODIMENTS

The process of the present invention provides a particularly efficacious method for the treatment of waste or other aqueous streams contaminated with nitro phenols, and particularly those nitro phenols of formula (I). Compounds of this type have a large commercial value, finding application in many different chemical processes, including the petrochemical and pesticide industries. Consequently, the problem of their disposal is one of increasing concern. The basic problem in the disposal of such materials, for example in process wastes, is the resistance of the aromatic nucleus to chemical or biological degradation. Heretofore, the dinitro phenols of formula (I) have proven to be particularly resistant to attack by microorganisms or by simple chemical decomposition, and satisfactory methods for their disposal have heretofore been unavailable. In accordance with the inventive concepts of the instant invention, applicants have found, in contravention to the explicit teachings of the prior art, that nitro phenols and particularly the dinitro phenols of formula (I), may be simply and efficiently decomposed without resort to drastic chemical treatments by oxidation with chlorine dioxide. The process of the present invention thus provides a particularly convenient method for disposing of these difficultly decomposable nitrated phenols, which not only ameliorates the toxicity problem associated with these compounds, but also eliminates the objectionable color which these compounds exhibit in aqueous solution. Moreover, in contrast to the prior art methods for the disposal of these compounds which require multiple step treatments with highly corrosive chemical agents, the instant invention provides a simple single-step treatment method for the removal of these compounds from aqueous streams.

The process of the present invention is highly advantageous for use in the treatment of aqueous streams contaminated with any of the nitrated phenolic compounds well known to those skilled in the art. Through the use of the instant process, the compounds are degraded into nonaromatic fragments which are then decomposable by conventional means into relatively harmless products. Compounds decomposable by the process of the instant invention include the nitro phenols, the dinitro phenols, trinitrophenol, and the substituted derivatives of these compounds wherein the aromatic ring has one or more substituents such as halogen, alkyl, amino, or carboxy groups. Examples of compounds suitable for treatment in accordance with the instant invention include para-nitrophenol, 2,4-dinitrophenol, 3,5-dinitrophenol, 4,6-dinitrophenol, 2,4,6-trinitrophenol, chloronitrophenol, dinitro-o-sec-butylphenol, and the nitro and dinitro ortho and para cresols, such as, for example, 3,5-dinitro-o-cresol, 4,6-dinitro-o-cresol, and 2,6-dinitro-para-cresol. Accordingly, effluent streams contaminated with any of these compounds may be successfully treated according to the process of the instant invention. In the preferred embodiment, however, the process of the instant invention is employed to substantially eliminate the dinitro phenols according to formula (I) from aqueous effluent streams, since a suitable process for the disposal of these compounds has heretofore been lacking in the prior art. In view of their large commercial importance, the dinitro ortho and para cresols, especially 2,6-dinitro-para-cresol, are particularly suitable for treatment by the instant process. As has been aforementioned, these compounds in addition to their use in other chemical processes, have recently been suggested for use as polymerization inhibitors in petrochemical conversion processes, such as for the production of styrene.

The process of the instant invention can be operated at any temperature between the freezing point and boiling point of the aqueous stream being treated. Conveniently, the process is carried out at ambient temperature, for example, 10° to 40° C. Moreover, any aqueous stream contaminated with a nitro phenolic compound may be treated by the instant process, including the oily effluent streams from petrochemical operations. In fact, the instant process is particularly suitable for removing dinitro cresols from the oily effluent streams of petrochemical operations.

The chlorine dioxide may be added to the aqueous waste stream in any method well known to those skilled in the art, and may be used in any amount which is sufficient to substantially decompose the nitro phenolic contaminant. In practice, it is usually necessary to employ a substantial excess of chlorine dioxide relative to the amount of nitro phenoic contaminant present. The molar ratio of chlorine dioxide to nitro phenol necessary to achieve substantial decomposition of the nitrated phenolic contaminant present in each stream is pH dependent and accordingly will vary for each effluent stream to be treated. For example, in acidic solutions of pH 4 or less, a mole ratio of chlorine dioxide to nitrated phenol of about 4.5 achieves decomposition of greater than 98% of the nitrated contaminant. In basic solutions of, for example, pH 11-12, substantially complete conversion of the nitrated compound is achieved only after the addition of about 10 or more moles of $ClO_2$ per mole of nitro phenol present. This difference in the amount of chlorine dioxide necessary to achieve substantial decomposition results from the fact that the first intermediate in the reduction of chlorine dioxide to chloride ion and hydroxide ion by the nitro phenol, $ClO_2^-$, is much less active at neutral and basic pH than at acid pH. More chlorine dioxide is required, therefore, in basic solutions than in acid solutions to oxidize the nitro phenolic contaminant.

In both acidic and basic solutions, however, applicants have found that substantial decomposition of the nitro phenols will be achieved upon the consumption of about 4.5 equivalents of chlorine dioxide per equivalent of nitro phenol. In acidic medium, this will be achieved with an initial mole ratio of ClO$_2$/nitro phenol of about 4.5, since substantially all the oxidizing species are consumed in the decomposition reaction. In basic medium, though, consumption of about 4.5 equivalents of chlorine dioxide by each equivalent of nitro phenol occurs only with an initial ClO$_2$/nitro phenol molar ratio of about 10 or more, since ClO$_2^-$ is accumulated in the reaction mixture.

In the preferred embodiment, therefore, chlorine dioxide will be added to the aqueous waste stream with a mole ratio of ClO$_2$/nitro phenol of at least about 4.5. With aqueous waste streams having a pH of 4 or less, this amount of chlorine dioxide will generally be sufficient to achieve decomposition of greater than 98% of the nitro phenolic contaminant. As the nitro phenols are rather strong acids, the chlorine dioxide solutions are relatively acidic, and the decomposition products of the reaction are inorganic and lower nonaromatic acids, the pH of the contaminated stream will most frequently have a pH of less than 6. In aqueous streams having a pH within this range, a mole ratio of ClO$_2$/nitro phenol of about 4.5 to 6 will be sufficient to achieve substantial decomposition of the nitro phenol.

Certain aqueous effluent streams nevertheless will be encountered which contain an excess of a basic substance and will accordingly have a basic pH. In such streams, as has been aforementioned, additional chlorine dioxide beyond the minimum molar ratio of 4.5 will be required to substantially decompose the nitro phenol present. The exact amount required will, of course, increase with increasing pH, and can easily be determine by one skilled in the art by titrating a sample of the waste stream with an aqueous chlorine dioxide solution. For most basic waste streams, a molar ratio of chlorine dioxide to nitro phenol within the range of about 5.0 to about 10.0 will be required.

Due to economic considerations, however, the use of large amounts of chlorine dioxide is undesirable. It is accordingly preferred to practice the present invention with aqueous streams having a pH of 6 or less, preferably less than 4. In a further embodiment of the present invention, applicants therefore contemplate the acidification of basic waste streams to reduce the pH thereof to within the aforementioned preferred pH ranges by the addition of a relatively harmless, low cost acid in order to reduce the amount of chlorine dioxide required to achieve substantial decomposition of the nitro phenol contaminant. Any acid, inorganic or organic, which is relatively harmless, readily biodegradable, and has a low cost will suffice for this purpose. A particularly preferred acid for this purpose is hydrochloric acid.

As has been mentioned, the chlorine dioxide may be added to the aqueous stream in any convenient method well known to those skilled in the art, such as, for example, bubbling chlorine dioxide gas through the contaminated stream, generating chlorine dioxide in situ through the addition of chemical reagents to the aqueous stream which react therein to produce chlorine dioxide, or any other method well known to those skilled in the art. In the preferred embodiment, however, it is preferred that the chlorine dioxide is added to the contaminated aqueous stream in the form of an aqueous chlorine dioxide solution, since in this form the chlorine dioxide is most easily handled. In this embodiment, the chlorine dioxide solution is added to the contaminated aqueous stream in an amount sufficient to provide a mole ratio of chlorine dioxide to contaminant within the ranges mentioned supra. The exact amount added will, of course, depend upon the concentration of the contaminant in the aqueous waste stream and upon the pH of the waste stream as well as the concentration of the chlorine dioxide aqueous solution. Typically, the aqueous chlorine dioxide solution will contain from about 1,000 to 2,000 ppm chlorine dioxide since chlorine dioxide solutions having a concentration within this range are normally not corrosive to stainless steel, lead, aluminum anodized linings, cement, glass, ceramics, and certain plastics such as polyvinylchloride and polyacrylates. However, any desired chlorine dioxide solution may be employed.

Any suitable method for preparing the aqueous chlorine dioxide solution may also be utilized. Suitable examples for the preparation of these solutions are described in the U.S. Pat. Nos. 3,123,521; 3,386,915; and, 4,013,761, the totality of which are herein incorporated by reference. When highly concentrated chlorine dioxide solutions are utilized or when the chlorine dioxide solution is to be stored for later use, stabilizing agents, such as sodium carbonate peroxide or sodium perborate, may also be incorporated into the chlorine dioxide solution. Typically, however, the aqueous chlorine dioxide solution is generated as needed by the reaction of an aqueous sodium chlorite solution with an aqueous chlorine solution in a chlorine dioxide generator, such as described in U.S. Pat. No. 4,013,761. Suitable generators for this purpose are those marketed by the Olin Corporation, and are described in the above patent.

While the exact mechanism of attack by the chlorine dioxide on the nitro phenolic contaminants is not known, experimentation to date has shown that chlorine dioxide oxidizes these compounds into colorless and less harmful nonaromatic fragments which are readily decomposed by biological organisms. Accordingly, the process of the instant invention provides a highly efficacious method for treating aqueous waste streams contaminated with these compounds. Moreover, chlorine dioxide is highly efficacious in controlling bacteria, slime, and other troublesome aqueous microorganisms. Use of the instant process thus accrues an additional concomitant advantage in simultaneously controlling these organisms as well as decomposing the nitro phenolic contaminants.

In order to more fully describe the present invention, the following examples are presented which are intended to be merely illustrative and not in any sense limitative of the invention.

EXAMPLE 1

A 100 ppm solution of 2,6-dinitro-para-cresol (DNPC) in deionized water was titrated with an aqueous chlorine dioxide solution comprising 1,900 ppm chlorine dioxide in deionized water. The course of the reaction was monitored by spectrophotometric analysis at 445 nm using a Beckman "Spec 20" spectrophotometer. The dinitro-para-cresol solution initially had an orange color and an absorbance of 1.1 at pH 4.3. The chlorine dioxide solution had a light yellow-green color and an absorbance of 0.77. After the addition of the chlorine dioxide solution in an amount sufficient to provide approximately 5.9 moles of chlorine dioxide to each mole of dinitro-para-cresol present, the orange color of the DNPC solution entirely disappeared. The final solution had an absorbance of 0.045, indicating that substantially all of the 2,6-dinitro-para-cresol had been substantially decomposed, with a light yellow-green color corresponding to that of the chlorine dioxide titrant solution.

As a control, the pH of the DNPC solution was increased to 12.4 by the addition of 2.5 normal sodium hydroxide. Upon the addition of the sodium hydroxide solution, the orange color characteristic of the presence of 2,6-dinitro-para-cresol did not return, confirming that this contaminant had been almost totally decomposed.

EXAMPLE 2

The experiment of Example 1 was repeated employing as a test solution, however, a 100 ppm solution of 2,6-dinitro-para-cresol (DNPC) which had its pH adjusted to pH 11 by the addition of sodium hydroxide. This test solution was chosen in order to simulate an oily aqueous effluent stream from a refining operation. The DNPC test solution initially had a deep orange color at pH 11. After the addition of chlorine dioxide to the test solution in a mole ratio of chlorine dioxide to DNPC contaminant of approximately 5.9, the orange color entirely disappeared. The final test solution had an absorbance of 0.055 with the light yellow-green tint of the chlorine dioxide solution. Addition of sodium hydroxide to the test solution failed to return the orange color, indicating that all of the 2,6-dinitro-para-cresol had been substantially oxidized.

The foregoing examples clearly demonstrate that chlorine dioxide represents a highly effective chemical agent for the decomposition of nitro phenolic contaminants, particularly dinitro phenol contaminants, in aqueous waste streams. The addition of chlorine dioxide to these waste streams in a mole ratio of approximately 5.9 moles chlorine dioxide to each mole of contaminant substantially decomposed these contaminants into colorless and relatively harmless nonaromatic fragments which are easily handled by conventional means, without resort to drastic or severe chemical treatments. Accordingly, in contrast to the explicit teachings of the prior art, chlorine dioxide provides a highly efficacious agent for the treatment of aqueous streams contaminated with nitro phenolic compounds.

While the invention has now been described in terms of certain preferred embodiments and illustrated by numerous examples, the skilled artisan will readily appreciate that various modifications, substitutions, omissions, and changes, may be made without departing from the spirit thereof. Accordingly, it is intended that the scope of the present invention be limited solely by the scope of the following claims.

What is claimed is:

1. A process for removing nitrated phenolic contaminants of the formula:

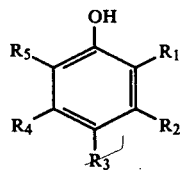

(wherein $R_1$, $R_3$, and $R_5$ are nitro, hydrogen, or alkyl groups, $R_2$ and $R_4$ are hydrogen or nitro groups, and at least two of said $R_1$, $R_2$, $R_3$, $R_4$, and $R_5$ are nitro groups) from aqueous streams having an acidic pH, comprising adding chlorine dioxide to said acidic stream in an amount sufficient to substantially degrade said contaminant.

2. A process for removing nitrated phenolic contaminants of the formula:

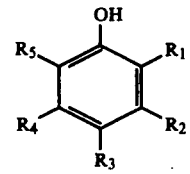

(wherein $R_1$, $R_3$, and $R_5$ are nitro, hydrogen, or alkyl groups, $R_2$ and $R_4$ are hydrogen or nitro groups, and at least two of said $R_1$, $R_2$, $R_3$, $R_4$, and $R_5$ are nitro groups) from aqueous streams, comprising:
   adding a relatively harmless acid to said stream to reduce the pH; and
   thereafter adding chlorine dioxide to said stream in an amount sufficient to substantially degrade said contaminant.

3. The process of claim 2, wherein said aqueous stream has a basic pH and said process further comprises acidifying said stream to a pH of less than about 6.0 by the addition of a relatively harmless acid.

4. The process of claim 3, wherein said chlorine dioxide is added to said acidified stream in an amount sufficient to provide a mole ratio of chlorine dioxide to nitro phenol contaminant of from about 4.5 to 6.0.

5. The process of claim 1 or 2, wherein said chlorine dioxide is added to said aqueous stream in an amount of at least 4.5 moles chlorine dioxide to each mole of nitrated phenolic contaminant.

6. The process of claim 1 or 2, wherein said aqueous stream has a pH of less than about 6.0 and said chlorine dioxide is added to said aqueous stream in an amount sufficient to provide a mole ratio of chlorine dioxide to nitrated phenolic contaminant of about 4.5 to 6.0.

7. The process of claim 1 or 2, wherein said chlorine dioxide is added to said aqueous stream in the form of an aqueous chlorine dioxide solution.

8. The process of claim 1 or 2, wherein said aqueous stream comprises an effluent stream from a petrochemical operation.

9. The process of claim 1 or 2, wherein said nitrated phenolic contaminant is a dinitrated cresol selected from the group consisting of dinitro ortho and para cresols.

10. The process of claim 1 or 2, wherein said nitrated phenolic contaminant is 2,6-dinitro-p-cresol.

11. The process of claim 1 or 2, wherein said nitrated phenolic contaminant is 2,6-dinitro-p-cresol, and said chlorine dioxide is added to said aqueous stream in the form of an aqueous chlorine dioxide solution in an amount sufficient to provide a mole ratio of chlorine dioxide to 2,6-dinitro-p-cresol contaminant of at least about 4.5.

* * * * *